(12) United States Patent
Martin et al.

(10) Patent No.: US 10,270,506 B2
(45) Date of Patent: Apr. 23, 2019

(54) SYSTEM AND METHOD FOR WIDELY-SPACED COHERENT TRANSMIT ARRAYING USING A REMOTE RECEIVER

(71) Applicant: Specialized Arrays, Inc., Melbourne Beach, FL (US)

(72) Inventors: G. Patrick Martin, Merritt Island, FL (US); Kathleen Marie Minear, Palm Bay, FL (US)

(73) Assignee: Specialized Arrays, Inc., Melbourne Beach, FL (US)

( * ) Notice: Subject to any disclaimer, the term of this patent is extended or adjusted under 35 U.S.C. 154(b) by 472 days.

(21) Appl. No.: 15/013,283

(22) Filed: Feb. 2, 2016

(65) Prior Publication Data

US 2017/0099091 A1    Apr. 6, 2017

Related U.S. Application Data

(60) Provisional application No. 62/236,976, filed on Oct. 5, 2015.

(51) Int. Cl.
*H04B 7/06* (2006.01)
*H04B 17/24* (2015.01)
(Continued)

(52) U.S. Cl.
CPC ............ *H04B 7/0615* (2013.01); *G01S 7/006* (2013.01); *G01S 7/288* (2013.01); *G01S 13/0218* (2013.01);
(Continued)

(58) Field of Classification Search
CPC ...... H04B 7/0615; H04B 17/14; H04B 17/19; H04B 17/309; H04B 17/24; H04B 17/318;
(Continued)

(56) References Cited

U.S. PATENT DOCUMENTS 6,115,409 A * 9/2000 Upadhyay ............ H01Q 3/2605
370/487
6,243,568 B1 * 6/2001 Detlef .................... H04B 17/23
455/226.4
(Continued)

OTHER PUBLICATIONS

Raghothaman et al., "Transmit Adaptive Array Without User-Specific Pilot for 3G CDMA", 2000, ICASSP '00, Proceedings 2000 IEEE International Conference on Acoustics, Speech,and Signal Processing, (Year: 2000).*

(Continued)

*Primary Examiner* — Frank J McGue
(74) *Attorney, Agent, or Firm* — Jacob M. Ward; Ward Law Office LLC (57) ABSTRACT

A system and method for operating a communications or radar system wherein the system is a closed-loop coherent transmit array consisting of a plurality of antenna elements that may be widely-spaced, many wavelengths apart, an array control system, and a remote receiver that can feed-back a measure of the transmit performance, and is a cooperative receiver, a bent-pipe, or a reflector. The method involves generation of weights which are applied to the array transmit signals based on feed-back data from a remote receiver compensating for at least one: circuit, propagation, and polarization phase errors. The method correlates feed-back performance changes with transmit weight perturbations, enabling maximization of transmitted power delivered to the remote receiver. The method further involves an optimization control process that can be coordinated, with systematic weight perturbations and adjustment, or which can be operated asynchronously and autonomously, nevertheless achieving maximization of the received signal power.

19 Claims, 4 Drawing Sheets

(51) Int. Cl.
*H04B 17/309* (2015.01)
*G01S 7/00* (2006.01)
*G01S 7/288* (2006.01)
*G01S 13/02* (2006.01)
*G01S 13/74* (2006.01)
*G01S 13/87* (2006.01)
*H04B 17/14* (2015.01)
*H04B 17/19* (2015.01)
*H04B 17/318* (2015.01)

(52) U.S. Cl.
CPC ............ G01S 13/74 (2013.01); G01S 13/878 (2013.01); H04B 17/14 (2015.01); H04B 17/19 (2015.01); H04B 17/24 (2015.01); H04B 17/309 (2015.01); *H04B 17/318* (2015.01)

(58) Field of Classification Search
CPC .... G01S 13/0218; G01S 13/878; G01S 13/74; G01S 7/288; G01S 7/006
USPC ........................................................ 342/458
See application file for complete search history.

(56) References Cited

U.S. PATENT DOCUMENTS

| | | | | |
|---|---|---|---|---|
| 6,898,434 | B2* | 5/2005 | Pradhan | H04W 4/02 342/450 |
| 7,050,787 | B2* | 5/2006 | Caci | G01S 5/021 455/404.1 |
| 8,634,853 | B2* | 1/2014 | Bogatin | G01S 5/0284 370/310.2 |
| 8,965,403 | B2* | 2/2015 | Rieger, III | G01S 5/0252 455/404.2 |
| 8,971,915 | B2* | 3/2015 | Alizadeh-Shabdiz | G01S 5/0278 455/418 |
| 2006/0170591 | A1* | 8/2006 | Houri | G01S 5/0242 342/357.31 |
| 2006/0284757 | A1* | 12/2006 | Zemany | G01S 13/32 342/22 |
| 2007/0118286 | A1* | 5/2007 | Wang | G01C 21/165 342/357.59 |
| 2008/0012764 | A1* | 1/2008 | Kang | H04B 7/0634 342/367 |
| 2008/0081556 | A1 | 4/2008 | Robinson | |
| 2008/0303901 | A1* | 12/2008 | Variyath | G01S 5/02 348/143 |
| 2013/0002472 | A1 | 1/2013 | Crouch | |
| 2013/0069829 | A1* | 3/2013 | Smely | G01S 11/10 342/458 |
| 2015/0329217 | A1* | 11/2015 | Kirk | B64D 45/00 701/301 |
| 2015/0355324 | A1 | 12/2015 | Minear et al. | |
| 2016/0204879 | A1* | 7/2016 | Niewczas | H04B 11/00 455/41.1 |

OTHER PUBLICATIONS http://arc.aiaa.org/doi/book/10.2514/4.868184 (2011 Published by American Institute of Aeronautics and Astronautics).
A—High Power Uplink https://www.fbo.gov/?s=opportunity&mode=form&id=c5066f41a045db5a167db138306794d6&tab=core&_cview=0 (Mar. 15, 2012).
"Space Debris and Human Spacecraft" http://www.nasa.gov/mission_pages/station/news/orbital_debris.html (Sep. 26, 2013).

* cited by examiner

| INVENTOR(S) | METHOD | FEATURES | |
|---|---|---|---|
| L. D'Addario<br>Calibration Towers | Position, time, external calibration<br><br>5-1.2m collinear<br><br>~4.2m apart | Troposphere:<br>Calibration:<br>Availability:<br>Dish size/number:<br><br>Synchronization:<br>Extensible to Ka?:<br>Demonstrated: | 1. No<br>2. Towers<br>3. Recalibrate after hardware changes<br>4. Small w/respect to tower range; many, no limit<br><br>5. Time<br>6. Doubtful<br>7. Ku-band 2009 |
| V. Vilnrotter<br>Moon Bounce | Position, time, external calibration<br><br>3-34m<br><br>260-490m apart | Troposphere:<br>Calibration:<br>Availability:<br>Dish size/number:<br><br>Synchronization:<br>Extensible to Ka?:<br>Demonstrated: | 1. No<br>2. Moon required<br>3. Recalibrate after hardware changes plus initial cal.<br>4. Requires state-of-the-art expensive dishes<br>Limited # dishes due to pair-wise cal. process<br><br>5. Time<br>6. Doubtful<br>7. X-band 2008 |
| Martin & Minear<br>Self-Calibrating | Position, ~time, phase, self-calibration<br><br>3-12m<br><br>~60m apart | Troposphere:<br>Calibration:<br>Availability:<br>Dish size/number:<br><br>Synchronization:<br>Extensible to Ka?:<br>Demonstrated: | 1. Yes, real-time<br>2. Continual self-calibrating using phase transfer<br>3. Continuous, accommodates hardware change<br>4. Any<br><br>5. Phase for carrier, coarse time for data<br>6. Possible<br>7. X-band 2010 |

Self-calibration method enabled new capabilities

SYSTEM AND METHOD FOR WIDELY-SPACED COHERENT TRANSMIT ARRAYING USING A REMOTE RECEIVER

CROSS-REFERENCE TO RELATED APPLICATIONS

This application claims the benefit of U.S. Provisional Application No. 62/236,976 filed on Oct. 5, 2015. The entire disclosure of the above application is hereby incorporated herein by reference.

FIELD

The disclosure relates to both communications and RADAR coherent transmit systems for missions such as battlespace awareness, intelligence gathering, ground to satellite communication and Space Situational Awareness (SSA).

BACKGROUND

Applicant has previously disclosed a system and method for detection and orbit determination of Earth orbiting objects as described in the Applicant's copending U.S. Published Patent Application No. 20150355324, the entire disclosures of which is hereby incorporated herein by reference.

STATE-OF-THE-ART

Figure 1:
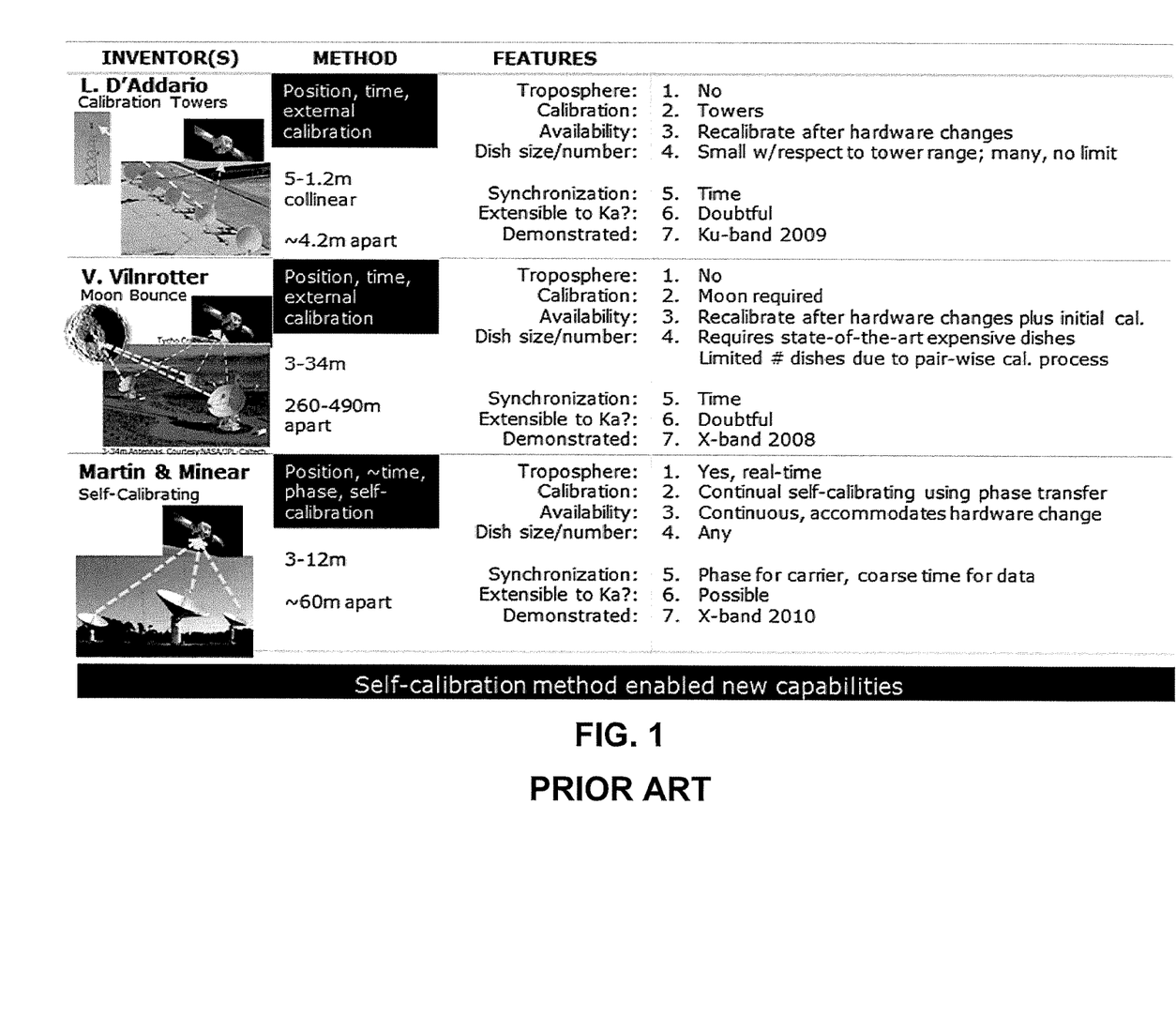
FIG. 1 is a table depicting prior art "open-loop" methods and system for comparison to the "closed-loop" method and system of the present disclosure.

As shown in FIG. 1, only three successful demonstrations of widely-spaced large reflector coherent transmit methods are known in the art. Known methods include: (1) a self-calibrating method (Martin & Minear Method); (2) a Moon Bounce method (Vilnrotter, JPL); and (3) a Calibration Towers method (D'addario, JPL). Issues and limitations for each known method are shown in the table in FIG. 1, and are also discussed by Davarian, F., "Uplink Arraying for Solar System Radar and Radio Science," in Proceedings of the IEEE, vol. 99, no. 5, pp. 783-793, May 2011 doi: 10.1109/JPROC.2010.2098831.

The above-disclosed known methods are all "open-loop" methods. In "open-loop" methods, no feedback signal capable of affecting operation is returned from the remote receiving target to the transmitter. It is notable that Vilnrotter's method uses a return signal for calibration, but not for operation. Martin and Minear's Method included an option for atmospheric mitigation. It used a receive source in the main beam of a single antenna to sense the atmosphere. It did not require a cooperating receiver or even a man-made source nor was it a closed-loop feedback system. An open-loop mode of operation is necessary in deep space communications, since great latency would render timely feedback infeasible.

The self-calibrating method of Martin & Minear, demonstrating use of three widely spaced twelve meter transmitters, was declared by NASA Headquarters as the first operationally feasible approach since the method handled the atmospheric effects in real time and was continually self-calibrating (all electronics and fiber) the instant it was turned on. See 13 Dr. G. P. Martin, Ms. Kathleen Minear at NASA; http://arc.aiaa.orq/doi/book/10.2514/4.868184 (2011 Published by American Institute of Aeronautics and Astronautics).

As a result, the Martin & Minear method enables the use of common off the shelf ("COTS") parts and antennas. Accordingly, a part could be replaced or changed out without recalibrating the system, and without affecting the availability of the system. This was demonstrated when an amplifier failed during a NASA demo. NASA Headquarters, Barry Geldzahler described Martin & Minear as, " . . . the originators of and the only team in the world that has demonstrated operationally feasible, real-time radio frequency adaptive optics techniques" in 2010. See "A—HIGH POWER UPLINK" https://www.fbox.gov/?s=opportunity&mode=form&id=c5066f41a045db5a167db138306794d6&tab=core&_cview=0 (Mar. 15, 2012).

The continual self-calibration method utilizes either a phase or a time transfer to synchronize the signals from each antenna perturbed due to the electronics and fiber. Using phase transfer enables very large spacing (on the order of thousands of wavelengths) between the dishes. Also this method uses a complex envelope approach—carrier (phase transfer) and information (time transfer) are handled separately to handle time-of-flight phase differentials.

Vilnrotter's Moon Bounce method enables use of three widely spaced thirty-four meter dishes, but disadvantageously requires state-of-the-art custom antennas and circuitry. Accordingly, the Moon Bounce method is incapable of utilizing COTS components. Additionally, the custom antennas and circuitry are expensive stable equipment (34 m dishes), are limited in frequency of operation due to not mitigating atmospheric effects in real-time, and are limited by availability of the Moon due to their need for imaging a spot thereon for calibration.

The Moon Bounce method was developed specifically for the NASA Deep Space Network (DSN), which consists of the highest quality antenna, RF equipment, and software systems. This extensive and expensive infrastructure includes precise temperature control of all electronics and fiber. Therefore, significant work is required to extend the Moon Bounce method to low-cost, COTS antennas and parts. Further, the Moon Bounce method requires immediate recalibration of the system if any changes were made to the hardware in the system. Calibration of the system is time consuming, and in fact operationally limits the number of dishes in the system. Moreover, the reliance on the Moon being available during calibration (at a certain elevation angle) further reduces the operational viability of the Moon Bounce method. Finally, the Moon Bounce method also fails to handle atmospheric variation and so was not applicable to higher frequencies such as Ka-band. At X-band and at a high elevation, the atmosphere is not an issue so calibration using the Moon and then pointing off towards a target (EPDXI demo) is possible. But at lower elevations, the troposphere poses a problem even at X-band, as demonstrated by Martin and Minear on the NASA TxACE program by turning the tropospheric mitigation feature ON and OFF while communicating with a low-elevation DSCS satellite.

D'Addario's Calibration Tower approach was implemented using five 1.2 meter dishes that were closely spaced due to time-transfer method. The Calibration Tower approach relies on towers for calibration and fails to address atmospheric variation. The Calibration Towers approach is not easily extendable to larger reflectors due to near-field and tower visibility constraints.

Retrodirective arraying is another open-loop method offering the potential for an array to respond ideally to an arbitrarily located and polarized source automatically, without the need to know array position, orientation, etc., with only relatively simple processing actions taken at the array.

However, the most serious limitation of retrodirective methods is that uplink and downlink frequencies need to be nearly identical. While this could be possible in a TDMA or radar application, it otherwise makes the method inapplicable for most communication systems, particularly those for satellite communications, which have strictly allocated different bands for receive and transmit.

This limitation may be mitigated by slightly offsetting receive and transmit frequencies, but the further apart array elements are in wavelengths, the more serious error develops, with even very small offset resulting in significant beamforming errors.

Additionally, retrodirective receivers must contend with the transmitter output coupling into the receive path, with contribution potential for oscillation, and with noise. This limits both the maximum output power (before oscillation) and the weakest signal that can be received due to transmitter noise. In specialized jamming applications, Raytheon describes in U.S. Patent Application Publication No. 20130002472, filed on Jun. 28, 2011, a method using a modulated laser designator to realize the downlink, with RF for the uplink, thus solving the problem of isolation. This is not a general solution, however.

Other issues with retrodirectivity include latency and deficiencies with sensing and adjustment: Latency is an issue for remote targets, in that target motion can result in the return beam going to where the target was, not where it is. In other words, look-ahead beam pointing is not possible in general. Also, when beam shaping and sidelobe control is important (e.g., LPI and LPD), retrodirectivity has no means for sensing and adjustment.

The three methods shown in FIG. 1, and described in the Background section hereinabove, demonstrated "open-loop" widely-spaced transmit arraying approaches for space targets such as lunar or Mars orbiters. They require precise knowledge of each antenna element's ARP (Antenna Reference Point), whether by surveying or long observation of known celestial sources. However, they are not applicable to quick deployment, quick setup missions or where the antennas are not stable. They also require other costly means to set and to control transmit circuit phase variations or custom, expensive, state-of-the art antennas (e.g. Deep Space Network).

Since open-loop methods for widely-spaced large reflector coherent transmit systems demonstrate the above-described drawbacks, there is a continuing need for a "closed-loop" method which provides and uses feedback from a remote receiving target to achieve an optimum response. It is also desirable to develop a closed-loop widely-spaced large reflector coherent transmit method for targets that are not too distant from the transmitting array, so that feedback latency is low enough that circuit and propagation variation can be corrected quickly enough to keep losses acceptable.

SUMMARY

In concordance with the instant disclosure, a closed-loop method which uses feedback from the remote receiving target to achieve an optimum response, and which is feasible for targets that are not too distant from the transmitting array, so that feedback latency is low enough that circuit and propagation variation can be corrected quickly enough to keep losses acceptable, has surprisingly been discovered.

The present disclosure particularly relates to a method for coherently transmitting the same information from a multitude of widely-spaced antennas, each with an independently adjustable complex or phase weight controlling that element's transmitted signal phase to a target where the power from all the transmitters combines coherently. It is assumed that the target can then return a measure of the received signal strength to the transmitting array, providing feedback that enables adaptively maximizing the coherent signal at the target. Transmit weights are determined by an algorithm using orthogonal transmit weight perturbations to determine each element's coherent contribution to the received power, and then to make adjustments that maximize that element's coherent contribution to the total. The target, which is also referred to herein generally as a "remote receiver," can be cooperative, non-passive (such as a 'bent pipe' COMSAT), or even a non-cooperative radar target that returns the power sample. Updated weights are then applied to the signals leaving the array antennas resulting in a closed-loop coherent transmit arraying system capability. Additionally, although the method of the present disclosure is described herein primarily with respect to widely-spaced antennas, it should be appreciated that the method is also applicable to other antenna arrangements, as desired.

In many applications the method of the present disclosure enables a transmit array to operate almost as flexibly as adaptive receive-only arrays have been operating for decades without the limitations and/or complexity of open-loop methods. Thus, the present disclosure enables such diverse applications as on-the-move military communications, arraying on a flexing structure such as shipboard, off-shore oil exploration platforms, where smaller antennas could be located on a space-available basis, arraying across very wide distances (1000's km) where the sensors are not mutually visible, or with additional development arraying mobile high-gain antennas.

Innovativeness of the Approach:

As a result, new methods for coherent transmit arraying that offer quick setup, wider spacing, and new mission capabilities has been the focus. The invention described herein is designed for use with closer targets (rather than deep space), such as Earth-orbiting satellites. It creates a closed-loop with a non-passive (cooperative) source. It features auto-spatial synchronization of the antennas and auto phase/time synchronization of all electronics and fiber.

Mission Application Examples:

Communications to a GEO Satellite From Widely-spaced Antennas.

One purpose of the proposed system is communication with a GEO satellite from an array of ground reflectors. They can be widely-spaced such as 100's of meters or 1000's of kilometers. The only requirement is that the cooperating target be in the beam of each of the individual antennas. With the present method, large amounts of data can be sent from the ground antenna array to a satellite without the need for surveying the antenna reference points of each of the individual antennas as required by state of the art methods reviewed above and without the need for precise knowledge of circuit or propagation phase differentials.

Quick Deployment of a Ground Transmit Array.

In a tactical communications environment, this new technology enables quick deployment of smaller antennas, each with lower power amplifiers collectively enabling coherent transmission of large amount of data, since array EIRP increases as the number of elements squared.

Missions Desiring Lack of Attribution.

Dispersal of smaller antennas coherently transmitting make individual element targeting difficult since the array phase center need not correspond with any given antenna, and since enemy targeting by AOA may fail due to the sensor being in the array's near field. The low power amplifiers increase the difficulty of accurately locating individual antennas in the array's locality.

Missions Requiring Built-In Redundancy.

Also, the array provides built-in redundancy in the event one is put out of service; the others continue to send the data up to the target. This is useful for battlespace awareness applications.

Space Situational Awareness (SSA).

Another mission application is SSA. Applicant's copending U.S. Published Patent Application No. 20150355324 describes this coherent transmit RADAR system in detail. This system is used for:

Detection and orbit determination of Earth orbiting objects;

Monitoring of space junk which poses a threat to active satellites; and

Avoidance of collisions of active satellite.

ESA as of Jul. 25, 2013 has estimated there are 29,000 larger than 10 cm, 670,000 larger than 1 cm, and more than 170 million larger than 1 mm. NASA has estimated there are more than 20,000 larger than a softball, 500,000 larger than a marble, and millions so small they cannot be tracked. See "Space Debris and Human Spacecraft" http://www.nasa.gov/mission_pages/station/news/orbitaldebris.html (Sep. 26, 2013). The Air Force (SSN) believes there are more than 21,000 objects larger than 10 cm, 500,000 between 1 and 10 cm.

A 10 cm object could destroy a satellite, a 1 cm object could disable a spacecraft, and a 1 mm object could destroy a sub-system on a spacecraft. The greatest concentration of orbital debris is thought to be around 800-850 km, with most within 2000 km from the Earth. This is the LEO orbit. As of October of 2013, it was reported in Universe Today that there were 1071 operational Earth-orbiting satellites. About 50% were launched by the United States of America. In as few as 50 years, upper LEO and lower MEO may be unusable due to space junk.

Since a radar target returns the signal, it can be considering cooperating in the sense required for this invention in this application.

Exemplary Embodiments:

In a particular embodiment, a system and method for widely spaced antenna coherent transmit using a receive source (e.g. cooperative or bent-pipe or reflector) has been discovered. It includes most of the benefits of the arraying technology such as $N^2$ EIRP increase, built-in redundancy, low power per element, dynamic re-configurability, and graceful degradation in the event of an element failure or maintenance, but also for the first time enables quick deployment of ground reflectors for large data upload for battlespace awareness or other applications when it is difficult to know exact element locations and to know circuit and propagation phase.

The system and method comprises a plurality of antennas configured to transmit a signal, a target which returns some of the transmitted signal (such a radar reflection) or a cooperative communications target (such as a 'bent-pipe' system, or an on-board performance measurement that can be reported to the transmitting array controller), and an array controller using as a minimum weights derived from performance feedback from the target.

Using systematic perturbation of the array transmitting weights, radiated power delivered to the cooperative receiver varies. By feeding back a measure of the received power, then correlating those received power variation with the perturbations, the received signal can be maximized. Weight perturbations, weight control, and performance feedback can be accomplished in several ways discussed later, including direct calculation, random search and gradient following.

For a non-restrictive gradient following optimization example, weights are adjusted to follow the gradient of the Noise-to-Signal ratio (maximum SNR). This process is followed continually so as to accommodate expected variation over time.

The gradient $$\nabla_W(P_R) = \left[ \sum_{i=1}^{N} \vec{a}_i \frac{\partial P_R}{\partial W_i} \right]$$

of the received power can be determined explicitly using the definition of the partial derivative $$\frac{\partial P_R}{\partial W_i} = \text{Limit}\left[ \frac{\Delta P_R}{\Delta W} \right]_{\Delta W \to 0}.$$

Furthermore, it is possible to perturb all of the weights simultaneously and asynchronously, provided that the perturbation sequences are orthogonal (preserving the definition of the partial derivative). Perturbation sequences such as simple sequential, Walsh Functions, or Gold Codes can satisfy this requirement.

An additional important feature is the fact that the optimum transmit weight vector (which is the phase of the cumulative phase errors in a given pathway) is the eigenvector of the dominant eigenvalue of the system. This important result means that the system is orthogonal, and each transmit weight adjustment process can measure and follow its individual gradient without the need to synchronize or communicate with any of the other particular transmit pathways or controls. In other words, the several transmit elements may operate independently to form the optimum beam on the receiver.

The system is suitable for both communications and radar systems, and widely spaced ground reflector arrays for coherent transmit have significant advantages when the target is distant, such as orbital debris in a radar application or a geostationary satellite in a communications application.

In one embodiment, a closed loop coherent transmit communications or radar system includes a plurality of antennas that are widely spaced, a remote receiver, an array control system, and a performance monitor. The remote receiver is in communication with the plurality of antennas. The array control system is in communication with the plurality of antennas. The array control system is configured to cause a plurality of communications uplinks between the plurality of antennas and the remote receiver. The communications uplinks include transmit signals generated by the plurality of antennas and received by the remote receiver. The array control system further includes a component for generation of the plurality of weights to be applied to the transmit signals from the plurality of antennas to maximize a response at the remote receiver. The array control system also includes a component for application of the weights to the transmit signals for each of the plurality of antennas. This compensates for at least one of circuit, propagation, and polarization phase errors. The performance monitor is in communication with the remote receiver and the array control system and configured to receive the feedback information from the remote receiver relating to a measure of transmit performance from the plurality of antennas to the remote receiver. The feedback information is used by the array control system to generate the plurality of weights.

In another embodiment, a closed loop method for operating a coherent transmit communications or radar system includes a step of providing by the array control system a plurality of communications uplinks between the antennas and the remote receiver. The communications uplinks include transmit signals generated by the plurality of antennas and received by the remote receiver. The performance monitor then receives a plurality of communications downlinks from the remote receiver. The communications downlinks including the feedback information. The array control system then generates a plurality of weights to be applied to the transmit signals from the plurality of antennas to maximize the response at the remote receiver. The weights compensate for at least one of circuit, propagation, and polarization phase errors determined from the feedback information. The array control system then applies the plurality of weights to the transmit signals for each of the plurality of antennas. An improvement to the quality of the transmit signals received by the remote receiver in the communications uplinks is thereby realized.

DRAWINGS

The above, as well as other advantages of the present disclosure, will become readily apparent to those skilled in the art from the following detailed description, particularly when considered in the light of the drawings described hereafter.

FIG. 3 is a block diagram of a signal processing flow and method for beamforming control flow for a gradient-following method, for use with the array shown in FIG. 2. Other non-gradient methods listed later differ in algorithm details. Transmit weight perturbations are applied in a unique manner so that each array element can sense the effect on the composite beam. Received power information from the target is downlinked to the control process where performance specific to each channel extracted. This enables adjustments that maximize the response and continually adjust to any variations in circuitry, propagation, or target motion.

FIG. 5 is a schematic illustration depicting an enhancement to the basic adaptive algorithm allowing better response in an application with a relatively moving receiver. If the receiver is distant, such as one on a satellite, latency of feedback from the receiver to the array controller(s) would result in the solution always being non-optimum and lagging. In many applications, motion of the satellite can be well predicted and a system model can accurately approximately calculate the rate of change of the propagation path between array elements and the remote receiver. By summing this modeled term with the measured lagging gradient, the portion of the gradient that would be tracking the bulk of the propagation term is anticipated, mitigating the lag and rendering the total gradient quasi-static.

DETAILED DESCRIPTION

The following description is merely exemplary in nature and is not intended to limit the present disclosure, application, or uses. It should also be understood that throughout the drawings, corresponding reference numerals indicate like or corresponding parts and features. In respect of the methods disclosed, the order of the steps presented is exemplary in nature, and thus, is not necessary or critical unless otherwise disclosed.

Although closely spaced lattice transmit arrays (e.g., $\lambda/2$) are ubiquitous and have been for decades, there have been previously intractable obstacles in transmit arraying very widely spaced elements (elements spaced by one or more thousands of wavelengths). Major strides have been made since 2008, with solutions found for widely spaced large reflector arrays.

The three main challenges are: 1) Circuit phase variation; 2) Phase errors due to path differences (geometry); and 3) Differential propagation due mainly to the Troposphere.

The Martin & Minear method discussed above demonstrated that circuit phase variation ('one') could be handled using closed-loop control algorithms and specialized hardware, phase errors due to geometry ('two') could be handled to under one wavelength with surveying, and differential propagation could be detected and corrected for if 'one' and 'two' were already handled using an instant return algorithm.

However, many missions that could benefit from a coherent transmit array of antennas are not possible if surveying of the phase centers (antenna reference points) is required. Surveying is often not practical as in the case of quick deployable arrays and not possible as in the case of VERY widely spaced antennas due to lack of line-of-sight.

The innovative technology of the present disclosure removes or significantly mitigates precise element location and circuit and propagation phase knowledge limitations, permitting transmit array configuration and operation to be almost as flexible as adaptive receive-only arrays in a wide class of potential applications. This in turn enables such diverse applications as:

Arraying shipboard reflector antennas on a flexing structure;

Arraying large reflector antennas that are not mutually visible or easily surveyed;

Arraying mobile high-gain antennas (with additional development); and

Quick-deployable arrays of portable reflectors.

In all cases, it is assumed that the transmit chains share a common stable frequency source (depending upon the uplink frequency and extent of widely spaced element separation, these may actually be isolated atomic clocks).

Figure 2:
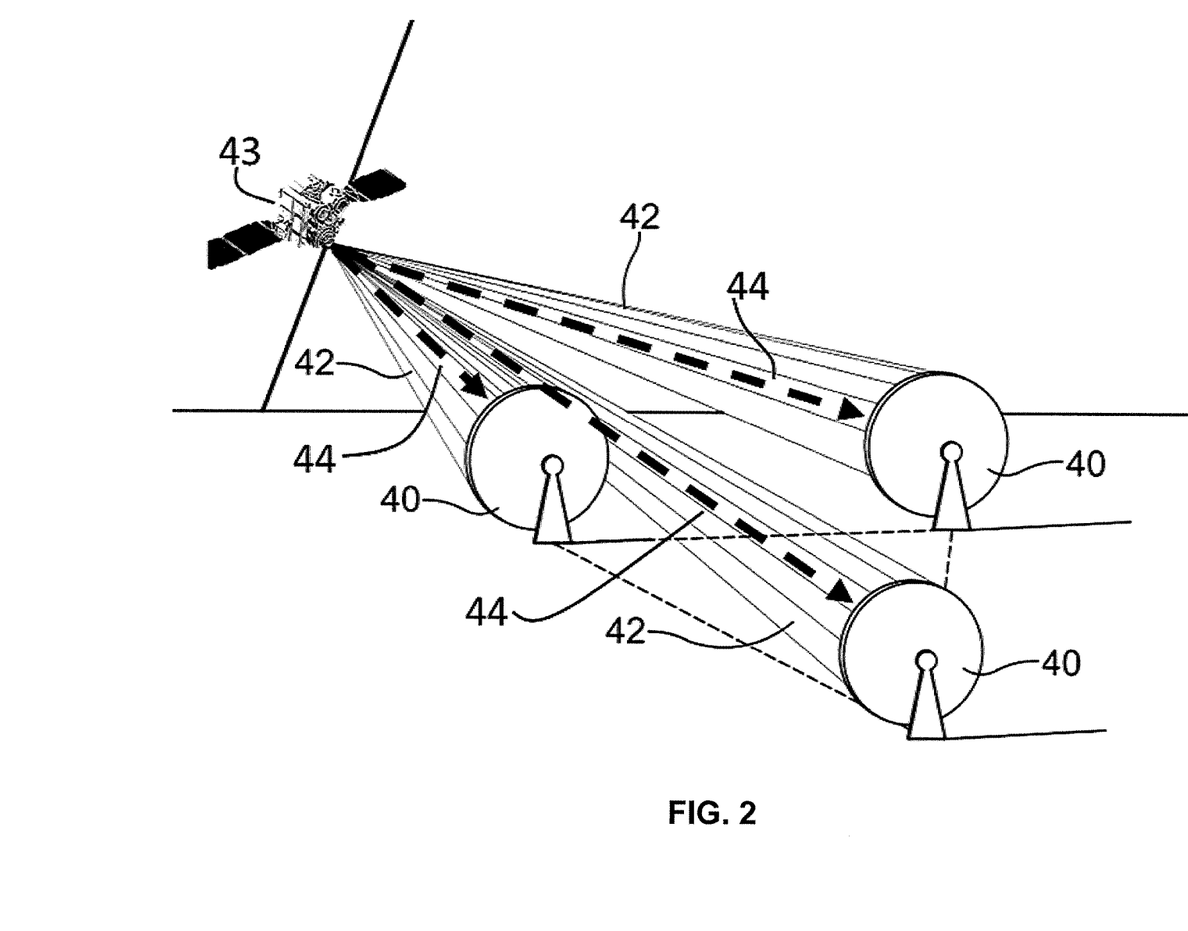
FIG. 2 is a schematic illustration of a closed-loop widely spaced coherent transmit system configuration, according to one embodiment of the present disclosure. Three large reflector antennas are shown, transmitting to a cooperative GEO satellite which then returns performance information to the transmitters. With this returned information, transmit weighting shown in FIG. 3 is adapted to maximize the power delivered to the satellite receiver.

Description of System:

A conceptual system configuration is illustrated in FIG. 2. Three large reflector antennas 40 are shown, transmitting to a cooperative GEO satellite 43. Tapering cones 42 converging at the satellite represent transmitted signals that are to be coherently combined there. These signals all have the same frequency and information content. The dashed lines 44 represent a downlink signal transmitted by the satellite that can be used to adaptively correct the RF phasing and information delay at the individual transmitters so as to ensure a maximum coherently combined signal at the satellite.

Complex Envelope Signal Processing.

While it is not necessary, a preferred embodiment applies a "complex envelope" paradigm; that is, the transmitted signal has the form $$s(t)=m(t)e^{j(\omega t+\vartheta)}$$

Figure 4:
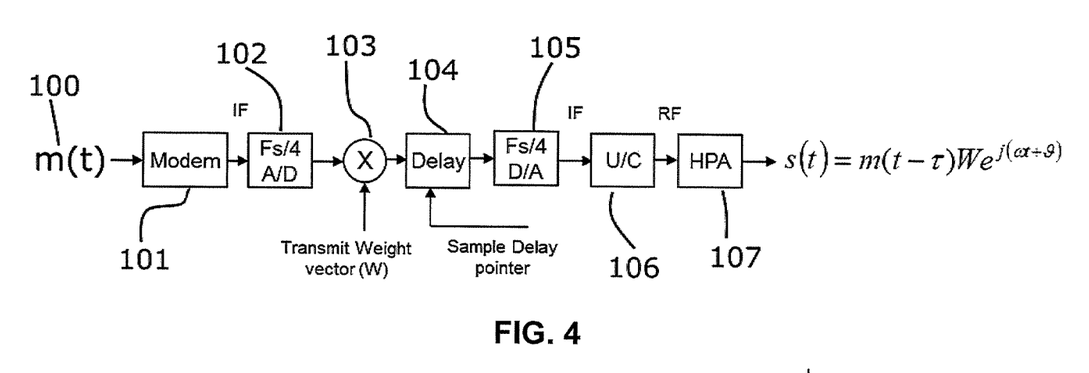
FIG. 4 is a block diagram describing a complex envelope signal array weighting paradigm, which provides a superior means for independently phasing and delaying the signals transmitted from the individual elements of the array shown in FIG. 2.

With reference to FIG. 45, where s(t) is the complex envelope signal, m(t) 100 is the baseband information content (complex functions at zero frequency), usually a digital stream (e.g., BPSK). A modem 101 modulates an intermediate frequency carrier, producing the analog signal $S_{IF}(t)=m(t)e^{j(\omega_{IF}t+\vartheta)}$. This analog signal is A/D converted and frequency converted to baseband typically with Fs/4 complex down conversion 102. The sampling rate must equal or exceed the required Nyquist criterion. At baseband, amplitude and phase adjustments to the signal are be applied with a complex multiplication (in-phase and quadrature). These multiplications must occur at the sample rate even though the weight values may be slowly varying. Information content delay is obtained by placing these weighted samples into buffer memory, and withdrawing them a designated time later. Weighted and delayed samples are then complex up converted from baseband to analog IF with D/A conversion and Fs/4 complex up conversion 104. This analog IF signal is then up converted to the desired transmit RF frequency 106, amplified and typically delivered to a high power amplifier (HPA) 107, after which it is sent to the antenna for radiation. This sequence of operations produces a weighted and delayed RF signal having the complex envelope form.

$$s(t)=m(t-\tau)We^{j(\omega t+\vartheta)}=Am(t-\tau)We^{j(\omega t+\vartheta+\beta)}$$

Clearly, the complex weight value can be expressed as the product of a real amplitude A and an exponential phase β, thus adding to the RF carrier phase.

Generating the signal to be transmitted by the array using the complex envelope paradigm has enormous advantages, including:

Signal delay and signal phasing are applied independently without interaction;

Large amounts of information delay can be applied digitally at baseband without affecting transmitted carrier phase (since delay is applied at zero frequency); and Carrier (RF) phasing is applied with a digital complex weight In a traditional transmit array, information delay and phasing are applied simultaneously by analog delaying the IF or RF signal. This is troublesome for widely separated array elements because it is very difficult to generate relatively large values of delay needed to align the information content in increments precise enough to simultaneously provide the required RF phase. Increments in the order of $$\frac{BW}{RF}$$

are required where BW is the information content bandwidth and RF is the carrier frequency. For example for a bandwidth of 10 MHz and a RF frequency of 10 GHz, there is a disparity of 1000 times.

With this general formulation, information content of the transmitted signal can be time aligned at baseband (preferably digitally) with zero effect on phase. Therefore relatively coarse methods (discussed later) may be used for obtaining information content alignment. On the other hand, carrier phase adjustment is critical, since this controls beam formation, determining where array transmitted power peaks and nulls spatially.

Description of Algorithm Block Diagram.

Figure 3:
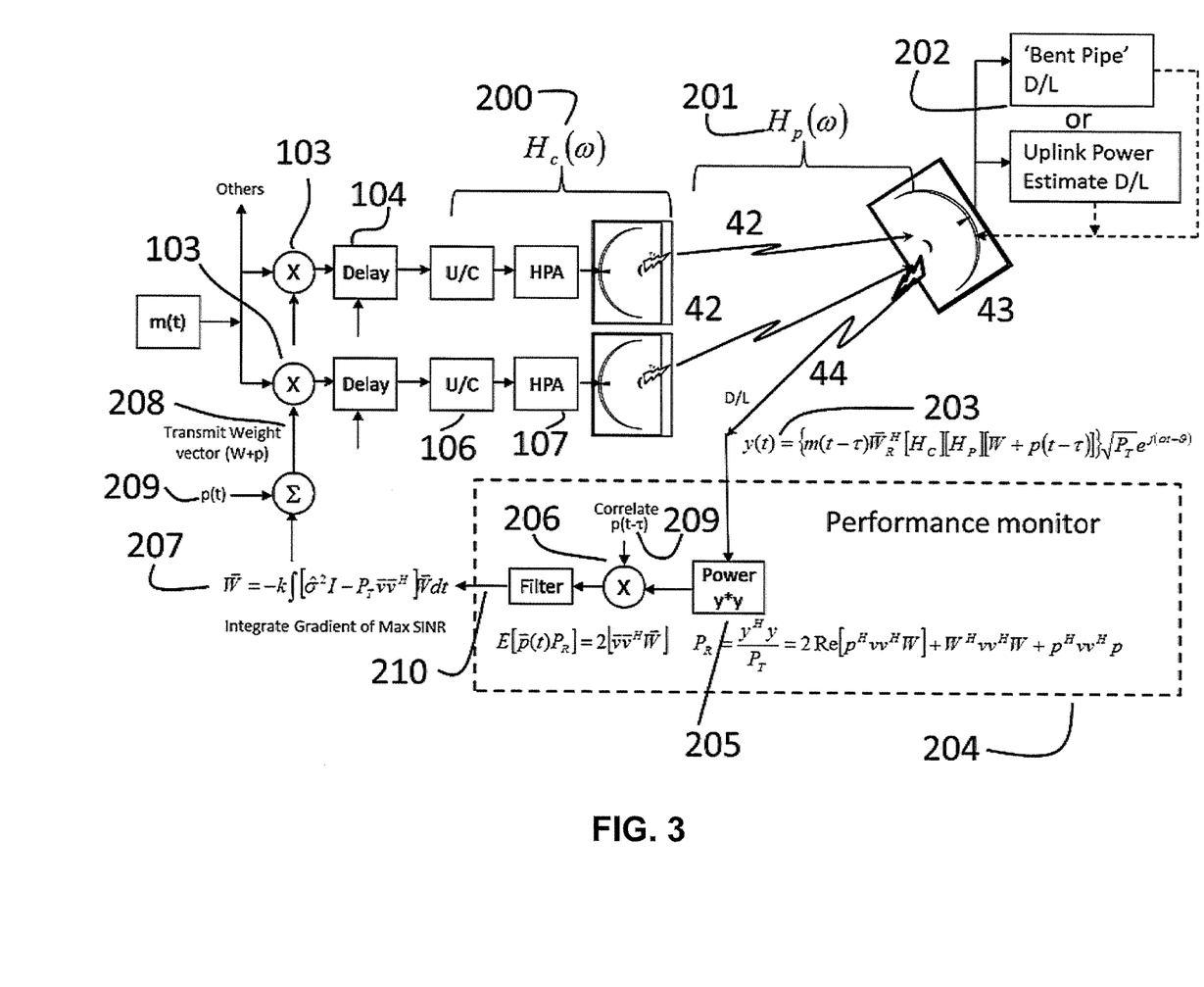

With reference to FIG. 3, a complex envelope paradigm is assumed. Carrier phase weighting can preferentially be applied at baseband via a complex multiplication 103 times the baseband signal at the sample rate (at least Nyquist), then up-converted 106 and amplified for transmit. This weighting is vectorial, meaning that each antenna in the array has an independent beamforming weight 208, baseband time delay 104, up-converter 106, HPA 107, etc., as illustrated in FIG. 3.

Notably, each transmit path will have arbitrary phase due to the variation of a multitude of components, including all circuit phase 200, with additional unknown phase due to its exact propagation path to the target, including unknown antenna position, differential water vapor in the atmosphere, etc., 201.

With these unknown independent phase error contributors in each of the several pathways, a random beam pattern (or interference pattern, if near-field) will be formed at the target, 43.

In this embodiment, it is assumed that a communications satellite target returns a downlink signal proportional to the received uplink signal. This condition is easily met if the COMSAT is a common 'bent-pipe' type 202, but could also be supplied by a 'health and status' parameter, or a custom onboard performance monitor, or a signal reflected from a target.

Transmit weights 207 are then perturbed 209 so as to enable an individual channel to uniquely determine its effect on the total received power. With this information, the several weights can be adjusted to adaptively maximize the performance indication proportional to the received uplink. There are a number of algorithms that can do this (such as synthetic annealing) but a preferred one may be both simple and as fast as possible while minimizing degradation of the uplink signal due to the applied weight perturbations. When the maximized solution is found, the individual weights will be the complex conjugate of their individual pathway to the target including all such factors as upconverter phase, propagation phase, and receive antenna phase versus incidence angle and polarization.

Following the flow in FIG. 3, it may be seen that the signal received at the satellite, y(t) 203 downlinked 44 to the array controller(s) can be written as:

$$y(t)=\{m(t-\tau)\vec{W}_R^H[H_C][H_P][W+p(t-\tau)]\}\sqrt{P_T}e^{j(\omega t+\vartheta)}.$$

Where m(t) 100 is the baseband information content of the signal, $[H_C]$ 200 is a diagonal matrix transfer function containing the cumulative phase of all circuit components, including up converters, amplifiers, cables, connectors and antenna components, and $[H_P]$ 201 is a diagonal matrix with propagation phase from each antenna through the atmosphere to the satellite over paths that differ due to antenna element location and water vapor content of the propagation path. Since each of the transmitted signals may arrive at the satellite antenna 43 from different angles and with different polarizations (particularly in a near-field situation where the array antennas are very widely separated), a receiving weight vector $\vec{W}_R^H$ is assumed to accommodate any satellite antenna's angle and polarization dependent response. In the absence of meaningful variation, $\vec{W}_R{}^H=[1,1,1,\ldots 1]$.

The carrier term $e^{j(\cap t+\vartheta)}$ in y(t) 203 may be at RF, IF, or baseband, depending upon signal processing at the satellite. This frequency is immaterial since the system and method are only interested in received power. Although unnecessary, for simplicity, it is assumed that each element in the array transmits with the same power, $P_T$. Received noise or co-channel interference is ignored since the transmit weights are unable to influence such contributions and as independent constants, cannot affect the optimization.

Since the details of the individual circuit and propagation terms are not of interest, it is convenient to define a vector, $\vec{v}$, which is also the desired (transmit) signal's steering vector. Its transpose is:

$$\vec{v}^H \equiv \vec{W}_R{}^H [H_C][H_P].$$

Therefore, substituting into 203 the output y(t) becomes:

$$y(t)=\sqrt{P_T}e^{j(\omega t+\vartheta)}m(t-\tau)\vec{v}^H W.$$

Received power is then:

$$y^H(t)y(t)=P_T[m^*(t-\tau)m(t-\tau)][W^H\vec{v}\,\vec{v}^H W].$$

In an expected value sense, it is assumed that the modulation is normalized, so that $\lfloor m^*(t)m(t)\rfloor=1$. If modulation is binary PSK or otherwise constant envelope, this condition is met with minimal averaging. Then, the following results:

$$y^H y = P_T\lfloor W^H \vec{v}\,\vec{v}^H W\rfloor.$$

By inspection, it is evident that satellite received power is maximized if $W=(\text{scalar})\vec{v}$.

Inspection will show that $\vec{v}$ is the conjugate of the sum of all intervening phase contributions.

Of course, $\vec{v}$ is unknown. Its value is found by adaptively optimizing the received power. From FIG. 3, a vectorial perturbation $\vec{p}(t)$ 209 is added to the current transmit weight vector 207, causing the received power to vary. Substituting $\vec{W}\Rightarrow(\vec{W}+\vec{p}(t))$ and expanding the following results:

$$P_R = \frac{y^H y}{P_T} = 2\mathrm{Re}[p^H vv^H W] + W^H vv^H W + p^H vv^H p.$$

Feedback 203 of the signal received at the satellite 43 is processed by a "Performance Monitor" 204, which in this case comprises or consists of determining the power of the received signal 205 then correlating 206 this perturbed power with the (appropriately delayed) perturbation sequences 209 and averaging (take an expected value), yielding the gradient 210 of the received power surface with respect to the transmit weights $$E[\vec{p}(t)P_R]=2P_T[\vec{v}\,\vec{v}^H\vec{W}].$$

This result requires that the normalized perturbation sequences are uncorrelated and zero mean, that is $$E[\vec{p}\,\vec{p}^H]=I.$$

This requirement is easily met, for example, with Walsh Functions or Gold Codes.

The optimum weight is found by following the gradient of the Noise-to-Signal ratio until it is zero. The Positive Signal Feedback Algorithm (PSF) may be used for this purpose. It solves for the minimum eigenvalue (maximum SNR) of the noise to signal ratio.

$$\nabla\left[\frac{W^H R_N W}{W^H R_S W}\right]=0.$$

In this case, received noise is constant with respect to the transmit weights, therefore the PSF algorithm differential equation is:

$$\frac{d\vec{W}}{dt}=-k[\hat{\sigma}^2 I - P_T \vec{v}\vec{v}^H]\vec{W}.$$

Scale factors are absorbed in k. Alternatively, after integrating, 207 results, $$\vec{W}=-k\int[\hat{\sigma}^2 I - P_T\vec{v}\,\vec{v}^H]\vec{W}dt.$$

At the solution, $$\frac{d\vec{W}}{dt}=0,$$

Thus the RHS of the differential equation above is also zero, yielding an easily solved eigenvector problem.

$$\vec{W}=\frac{P_T}{\hat{\sigma}^2}\vec{v}\vec{v}^H\vec{W}=\frac{P_T}{\hat{\sigma}^2}(\vec{v}^H\vec{W})\vec{v}=(\text{scalar})\vec{v}$$

We saw this result earlier by inspection, but without the perturbational PSF (PPSF) gradient following algorithm, had no means for finding it. Some interesting and important conclusions can be drawn from this result:

- $\vec{W}=\vec{v}$ is an eigenvector of the system, with eigenvalue $$\frac{P_T}{\hat{\sigma}^2}$$

- All the other eigenvalues are zero, representing nulls at the receiver, and are unstable solutions (so a null solution cannot persist).
- The optimum solution has positive feedback, so is very fast adapting.
- Since $\vec{W}$ is an eigenvalue, its components (individual weights) are uncoupled, thus may independently be adjusted for a maximum SNR. This means that the weighting controls at individual transmitters need not be coordinated. This would allow very wide separation of the elements of the array. To ensure decoupling, such perturbations must be orthogonal over long durations, suggesting Gold Codes or similar.

Notable Potential Simplification:

Since the system covariance matrix is singular with only one non-zero eigenvalue, it can be observed that the gradient equals a scalar times the eigenvector which is also the optimum steering vector:

$$E[\vec{p}(t)P_R]=2P_T[\vec{v}\,\vec{v}^H\vec{W}]=(\text{scalar})\vec{v}.$$

Potentially, this means that the optimum weight vector is determined in one-step by normalizing the measured gradient, without the need for integration of the gradient. This fact can be used to greatly speed up adaptation by immediately replacing the initial random $\vec{W}$ with the normalized gradient $\vec{v}$. However, some degree of averaging is necessary practically because there is always noise and bias in finite time measurement and because the system is rarely static. This required averaging can be well accomplished by the iterative adaptive update equation.

Speed is important since the environment may be changing rapidly. The preferred embodiment, just described, uses the Perturbational PSF Algorithm (where PSF is an acronym for Positive Signal Feedback). The PPSF directly determines the gradient of the maximum SINR surface using partial derivatives measured perturbationally (that is, weights are slightly varied in a deterministic manner, with the change in performance correlated with the weight variation). This process is continual, so that any changes are detected and compensated. As the optimum is approached, weight probations may be reduced in amplitude, minimizing degradation to the uplink signal. Typical degradations near a solution are amplitude variations of a few tenths of a dB which are negligible in phase modulated system waveform.

In this manner, starting from an arbitrary weighting condition, a beam or wave maximum is quickly formed and sustained at the receiving location.

Ultimately, this process is limited by latency combined with circuit and propagation phase variations that are faster than can be accommodated due to round trip time between the transmitting array and the receiver (latency). For a GEO satellite, this is about ¼ second, so significant phase changes faster than this cannot be tracked and corrected.

To some extent, however, expected variations can be anticipated and corrected.

Embodiment: Case of Fast Relative Motion of the Target

Figure 5:
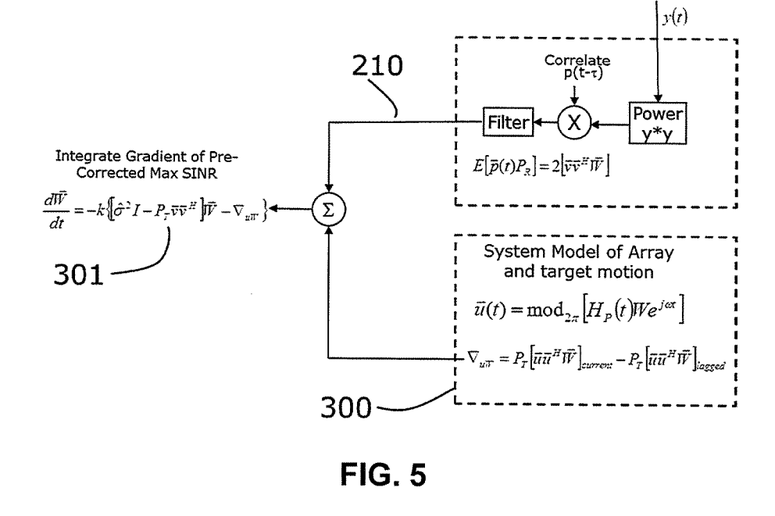

In another embodiment, this disclosure specifies that the perturbationally determined adaptive weights may lag behind the best solution due to fast relative motion of the target. This may be mitigated by applying approximate knowledge of the array element locations relative to the remote receiver (e.g. a satellite) using a System Model 300. The rate of change of approximately determined idealized weights will be approximately equal to the adaptively determined ones, though different in nominal quasi-static value due to unknown slowly varying phase contributions (such as individual circuits). Therefore, the applied adaptive gradient may be pre-corrected using the gradient of the idealized ones, allowing the adaptive process to focus primarily on slowly varying parameters such as circuit phase.

Let the rapidly varying term due to propagation (principally range change) be defined as:

$$\vec{u}(t) = \text{norm}\{\text{mod}_{2\pi}[H_P(t)We^{j\omega\tau}]\},$$

where $H_P(t)W$ is obtained from the approximate system model and the current value of W. The value of $$\frac{P_T}{\hat{\sigma}^2}$$

is known from the PSF, so after $\vec{u}(t)$ is normalized, one may form the term:

$$P_T[\vec{u}\vec{u}^H\vec{W}].$$

Both the estimated current value of this term as well as the lagged one may be calculated by the model, yielding a differential 300, $$\nabla_{uW} = P_T[\vec{u}\vec{u}^H\vec{W}]_{current} - P_T[\vec{u}\vec{u}^H\vec{W}]_{lagged}.$$

Then the total pre-corrected gradient 301 due to receiver motion becomes (after adjustment of scale factors):

$$\frac{d\vec{W}}{dt} = -k\{[\hat{\sigma}^2 I - P_T\vec{v}\vec{v}^H]\vec{W} - \nabla_{uW}\}.$$

Information Content Alignment

The previous discussion addressed carrier phase coherence at the remote receiver, assuming that information content was in alignment. For many applications, this is a good assumption, since GPS location of an antenna and pre-calibration of hardware and interconnection cables likely can realize less than 10 to 20 nanoseconds error in time alignment. Considering that alignment to within about 1/10 of an inverse bandwidth is sufficient for acceptable signal dispersion and power loss from ideal coherence, then an uplink bandwidth of roughly 10 MHz could be supported.

For those cases when adequate spatial location is unavailable, it is possible to use the weight perturbations and power measurements to align information content.

Information alignment delay, since it is at baseband, does not affect carrier phase. Consequently, for initial alignment, delay for an individual channel can be adjusted in roughly one-half inverse bandwidth increments over the range of location uncertainty. When the delay resulting in information overlap is applied, the power increase from uncorrelated to correlated will reveal the partial alignment. At this point, a gradient following delay optimization much like that for carrier phase can be conducted. Basically, one forms the partial derivative of received power with respect to the information delay. The advance/delay increments can use the same orthogonal carrier phase perturbation functions discussed above for this purpose.

If received power is monitored via a bent pipe D/L, then such correlation is much easier to perform since the differential delay of the individual uplink may be resolved with respect to the total through influence of the unique perturbational sequence.

In order that the sample delay buffer be reasonably sized and to prevent a channel from requiring an unrealizable time advance, it may be necessary that the delay range be readjusted for the several channels. This is readily accomplished if the system has a central controller; however in a semi-autonomous mode where each channel operates independently, some supplementary rudimentary communication will be required.

Advantages and How it is Distinguished from What is Old:

The present disclosure offers significant advantages over current widely-spaced transmit arraying methods, since it greatly reduces the a priori information required as well as required information precision. Additionally, precision hardware and/or specialized hardware and algorithms to control circuit phase are not required, since the system is a closed long-loop. This can greatly reduce array expense for a given level of performance.

Limitations of Current Methods

Current methods require:

Precise (sub-wavelength) position knowledge of the ARP;

Control of transmit circuit phase, meaning precision stable hardware or a closed loop means for correcting circuit phase;

Means for determining unknown differential effects. At some frequencies (e.g., X-band and above) and/or locations (e.g., high humidity, or target directions (e.g., low elevation links to a COMSAT), unknown differential propagation effects can seriously degrade beam formation. If corrected, additional receive circuit calibration, precise knowledge of the target's position, and sophisticated algorithms are required; and Among the limitations described in Section 2.1.4, retrodirective methods require uplink and downlink frequencies that are nearly identical.

Other Modes of Operation: Remote Cooperative Receiver Modes:

Alternative modes of operation may be characterized by how the remote cooperative receiver returns information to the adaptive transmit array.

Bent Pipe.

The remote receiver returns a copy or a portion of the received signal to the transmitter. This option allows the performance monitor to be located with the transmitter controller, and provides maximum flexibility in realization of the performance monitor. For example, a copy of the uplink information can be made available locally for correlation; typical COMSAT operation.

Signal Recognition Performance Monitor at the Receiver.

This option reduces D/L burden from the remote receiver at the expense of additional special purpose processing there.

Health & Status on Board.

Many existing COMSATS have a health and status D/L reporting on the signal strength present in each of the receive channels whether frequency division or TDMA. Received power measurements for the uplink channel could be used to support the uplink function.

Radar, Radar-Like.

Although not 'cooperative' in the bent-pipe sense, radar targets return the uplink signal. Weight perturbations can be synchronized with the transmit pulse. In the case of a wideband waveform like chirp or PN, a perturbation would conveniently be applied for the duration of a pulse.

Other Modes of Operation: Array Control Modes:

Other modes of operation are characterized by how the array is controlled (instead of how feedback information is returned to the controller):

Single Controller.

In this mode, elements in the array while widely spaced in wavelengths are nevertheless locally grouped. This could be an array of quick deployable reflector antennas connected by cables to a central controller. Consequently, the single controller has knowledge of each channel's weighting, delays, position, etc., and thus can operate in a coordinated manner.

Distributed Control.

In a Distributed Control mode, weighting control for each of the transmit channels can occur autonomously, without needing or using knowledge of the other channels. This mode would allow very widely spaced antennas (continental extent separation). This mode is possible because the optimum weight vector is an eigenvector of the system with each component of the vector being independent.

Supplemented with Rate of Change from Model.

In its most basic form, considerable latency may exist between a weight change and performance feedback. This means that in a dynamically changing scene transmit weighting would always lag the current situation. Performance degradation from this lag can be mitigated by anticipating target motion (e.g., its orbit), calculating weighting rate-of-change adjustment using a system model with approximate element positions and the target's anticipated motion. With this rate of change for the model, the rate of change of the actual scene can be approximated and used to pre-correct uplink weights, returning the adaptive optimization to a quasi-static case.

Control at Target.

In this mode, it is appreciated that the weight controller performance monitor and algorithm need not be located at the individual array elements. For example, the transmitting elements could be free flying satellites in a constellation, transmitting to a remote location, for example, on the earth or on another satellite, where the performance is measured and new weights calculated. These weights are then transmitted to the several elements and applied there.

Various Embodiments of the Disclosure:

The process may be realized in multiple ways, ranging from algorithms to determine and apply the derived optimum transmit weights, perturbational sequences to measure the required parameters, weighting methods to apply the weights, performance-monitoring alternatives that may be contingent upon the particular application (e.g., Radar).

As the derivation above has shown, the solution has a single eigenvector solution, leaving several options for how the solution can be approached and applied.

Options for How the Eigenvector Solution can be Approached and Applied.

Direct application of the measured gradient (which is also the solution), stepping immediately from the initial weight to the solution, then repeating each iteration;

Continual averaged movement (gradient following) from the initial weight using the measured gradient; and Using the two methods above but on an isolated element basis (as when the elements are widely separated and adaptation is uncoordinated)

Options Finding the Optimum Solution

Several algorithm options exist for finding the optimum solution in addition to gradient following:

Random search, in which weight values are generated randomly and applied, keeping the latest trial if it produces better performance or reverting to the previous best otherwise;

Synthetic Annealing, in which random weights with progressively reduced amplitude are applied, keeping the best;

Genetic Optimization, in which the weights are 'chromosomes', in which the weight population is 'mated', and the most fit weights survive to mate in the next cycle, evolving to the optimum solution or evolving to a changing environment;

Simple LMS gradient following, in which weight movement is in the direction of the negative gradient; and PSF algorithm, which utilizes the gradient to move in a quickly adapting positive feedback manner, rapidly following any environmental changes while averaging (integrating) previous inputs to smooth measurement errors.

Options for Perturbation Gradient Measurement

Some of the algorithms mentioned above combine perturbation functions along with weighting moves, but among those that follow a gradient or otherwise apply the measured gradient benefit from several perturbation gradient measurement embodiments:

Time-multiplexed three level using partial derivative definition (plus, minus, zero), where all other perturbations are zero when a given channel perturbation is nonzero;

Walsh Functions, bi-level continuous simultaneous perturbations, where each channel has a particular Walsh function uncorrelated with all of the others. These have zero cross correlation in one complete cycle; and Gold Codes, bi-level perturbation sequences, a different code for each channel, that on a long term basis have essentially zero cross correlation. These are useful when the individual channels cannot be conveniently synchronized.

Phase Shift Weighing.

In the derivations, a complex weighting function is assumed (i, q), however in many cases only phase shift is required. Phase shift may be realized by constraining the complex weights to unity amplitude, or the process can be implemented with analog phase shift at IF or RF frequencies. Some algorithms, for example the non-gradient ones listed above, could display cost advantages from use of analog phase shift weights. Since the system objective is maximum power transmitted to the remote receiver, weight amplitude would ordinarily be set to unity regardless, so there is little or no loss in effectiveness by using phase shift instead of complex weighting.

Near-Field Optimization of Received Signal.

A particular embodiment of interest locates transmit antenna facilities extremely far apart. Let us assume large antennas (e.g., 12 m reflectors operating at X-band) that can adequately determine uplink performance via a performance monitor operating on a bent-pipe downlink, reception of a satellite health and status parameter, or a custom on-board performance monitor. In this case, weight perturbations and adaptive corrections are orthogonal and may be applied locally without coordination with any of the others. The remote receiver may be in the near-field of the array elements thereby creating a 3-dimensional interference pattern rather than a beam. This adaptive optimization process ensures that the highest possible received power will be delivered to the remote receiver irrespective of circuit phase variation, propagation variation, and polarization variation.

Unique Perturbations Added to Information Content.

Rather than determining the transfer function contribution of an individual transmitting channel by unique perturbation of its weighting function, it is also possible to identify and characterize a particular channel by uniquely perturbing its information content. Previously in the discussion hereinabove with respect to "Description of Algorithm Block Diagram," all channels shared the same information content, m(t). In one embodiment, the $i^{th}$ channel can be allowed to transmit additional channel-unique information:

$m_i(t)=m(t)+p_i(t).$

The perturbation function p(t) can take many different forms, from extra known symbols inserted into an m-ary data sequence, frequency multiplexed terms (e.g., sine wave tones of slightly different frequencies), TDMA transmit channel unique symbols, etc.

A custom designed receiver can then, by correlating the signal received by the target with the known perturbation, obtain a unique measure of the cumulative transfer function for that individual channel. This custom receiver can be on-board the target or locally at the array controller if the target provides a "bent-pipe" downlink. If the receiver is on-board, it will require a priori knowledge of p(t).

It can be shown that the product of correlation with the received signal at baseband is:

$E[p_i(t)y(t)]=v_i^* w_i.$

Since W is known, one may solve for the cumulative phase shifts of the channels, v. Then, for the next weight iteration one may apply the currently optimum weight, W=v*. Such updates may be averaged to reduce noise or (as discussed earlier) v, which is also the gradient, may be integrated using the PSF algorithm (described hereinabove in the "Description of Algorithm Block Diagram" section) providing smoothing as well as providing a mechanism for introduction of supplementary model-based information (e.g., predictable target motion, as discussed hereinabove in the section titled "Embodiment: Case of fast relative motion of the target").

All of the considerations as to very wide spacing, independent adjustment of the weights, etc., covered above continue to apply in this case, since v remains a system eigenvector.

While certain representative embodiments and details have been shown for purposes of illustrating the invention, it will be apparent to those skilled in the art that various changes may be made without departing from the scope of the disclosure, which is further described in the following appended claims.

What is claimed is:

1. A closed loop method for operating a coherent transmit communications or radar system, the coherent transmit communications or radar system including a plurality of antennas, a remote receiver in communication with the plurality of antennas, an array control system in communication with the plurality of antennas, and a performance monitor in communication with the remote receiver and the array control system and configured to receive feedback information from the remote receiver relating to a measure of transmit performance from the plurality of antennas to the remote receiver, the method comprising the steps of:

providing by the array control system a plurality of communications uplinks between the antennas and the remote receiver, the communications uplinks including transmit signals generated by the plurality of antennas and received by the remote receiver;

receiving by the performance monitor a plurality of communications downlinks from the remote receiver;

generating by the array control system a plurality of weights to be applied to transmit signals from the plurality of antennas to maximize a response at the remote receiver, the weights compensating for at least one of circuit, propagation, and polarization phase errors determined from the feedback information; and applying by the array control system the plurality of weights to the transmit signals for each of the plurality of antennas, wherein the step of generating the plurality of weights to be applied to the plurality of transmit signals to maximize the response at the remote receiver includes a provision for calculation of complex weights, or a provision for calculation of phase shifters for aligning the carrier signal phase which comprises a weight control algorithm that correlates feedback performance changes with transmit weight perturbations, enabling maximization of transmitted power delivered to the remote receiver and an optimization control process that can be coordinated, with systematic weight perturbations and adjustment, or which can be operated asynchronously and autonomously.

2. The method of claim 1, wherein the weight control algorithm suitable for long-loop, closed-loop transmit arraying optimization includes at least one of a gradient following SNR maximization process, a direct calculation of the optimum weight, and a random search optimization method, and wherein the weights calculated are based at least on feed-back data from the remote cooperative receiver and wherein the weights calculated by the weight control algorithm compensate for phasing errors between the control system and said plurality of antenna elements.

3. The method of claim 1, wherein the step of applying the weights is performed by an apparatus that performs in-phase and quadrature multiplications or shifts the phase of the transmitted signals which results in the transmitted signals from each of the antennas arriving at the remote receiver substantially simultaneously.

4. The method of claim 1, wherein a computer model is used to pre-correct a rate of change of the weights.

5. The method of claim 1, further comprising a complex envelope methodology for transmit array beamforming in which RF phasing is independently accomplished with complex weighting and information alignment is accomplished at baseband by sample delay with no impact on phase.

6. The method of claim 1, wherein the step of generating the plurality of weights to be applied to the plurality of transmit signals includes a provision for calculation of baseband delay weights for aligning the signal information content for said plurality of antenna elements, wherein the means for aligning information content of the transmission from the several array elements comprises correlating feedback performance information with information delay perturbations.

7. The method of claim 1, further comprising a step of correcting for latency between a change in the plurality of weights to the transmit signals and receipt of the plurality of communication downlinks from the remote receiver.

8. The method of claim 1, wherein the remote receiver is one of a cooperative receiver satellite, a bent-pipe satellite, a reflector satellite, and a non-cooperative radar target that returns a power sample as the communications downlinks.

9. The method of claim 1, wherein the remote receiver provides the feedback information relating to the transmit performance to the performance monitor via the plurality of communications downlinks.

10. The method of claim 1, wherein the performance monitor further performs a step of correlating performance changes with weight perturbations, wherein the performance changes include at least one of power changes in the receive signal, and amplitude and phase coherency changes in the information content but are specific to an individual transmitter channel.

11. A closed loop coherent transmit communications or radar system, comprising:
a plurality of antennas;
a remote receiver in communication with the plurality of antennas;
an array control system in communication with the plurality of antennas and configured to cause a plurality of communications uplinks between the plurality of antennas and the remote receiver, the communications uplinks including transmit signals generated by the plurality of antennas and received by the remote receiver, wherein the array control system further includes a component for generation of a plurality of weights to be applied to the transmit signals from the plurality of antennas to maximize a response at the remote receiver, and a component for application of the weights to the transmit signals for each of the plurality of antennas compensating for at least one of circuit, propagation, and polarization phase errors determined from feedback information, wherein the component for generation of a plurality of weights to be applied to the plurality of transmit signals to maximize the response at the remote receiver includes a component for calculation of complex weights, or a component for calculation of phase shifters for aligning the carrier signal phase which comprises a weight control algorithm that correlates feedback performance changes with transmit weight perturbations, enabling maximization of transmitted power delivered to the remote receiver and an optimization control process that can be coordinated, with systematic weight perturbations and adjustment, or which can be operated asynchronously and autonomously; and
a performance monitor in communication with the remote receiver and the array control system and configured to receive the feedback information from the remote receiver relating to a measure of transmit performance from the plurality of antennas to the remote receiver.

12. The system of claim 11, wherein the component for generation of the plurality of weights to be applied to the transmit signals from the plurality of antennas includes a computer using software algorithms that maximize the response at the remote receiver.

13. The system of claim 11, wherein the remote receiver is one of a cooperative receiver satellite, a bent-pipe satellite, a reflector satellite, and a non-cooperative radar target that returns a power sample.

14. The system of claim 11, wherein the remote receiver provides the feedback information relating to transmit performance to the performance monitor via a plurality of communication downlinks from the remote receiver.

15. The system of claim 14, wherein the performance monitor is located at one of the remote receiver and the array control system, and the remote receiver has a transmit capability in order to return feedback information to the array control system.

16. The system of claim 11, wherein the component for application of the weights to the transmit signals for each of the plurality of antennas includes an apparatus for adjusting antenna transmission weighting values with in-phase and quadrature multiplication, or for a shifting in a phase of the transmitted signals, resulting in the transmitted signals from the plurality of antennas arriving at the remote receiver substantially simultaneously.

17. The system of claim 11, further comprising a component that implements a complex envelope methodology for transmission whereby RF beamforming is accomplished with carrier phase and information alignment is accomplished at baseband by sample delay.

18. The system of claim 11, wherein the array control system further comprises a component for correcting latency between a change in the plurality of weights to the transmit signals and receipt of a plurality of communication downlinks from the remote receiver.

19. The system of claim 18, wherein the component for correcting latency uses a computer modeled rate of change to calculate adjustment to the weights due to an actual rate of change.

* * * * *